United States Patent [19]

DeMarco et al.

[11] Patent Number: 5,319,350

[45] Date of Patent: Jun. 7, 1994

[54] MOTION DETECTION ASSEMBLY FOR USE IN COMBINATION WITH A MOTOR VEHICLE

[76] Inventors: Frank DeMarco, 11171 NW. 36 Ct., Coral Springs, Fla. 33065; Dennis DeMarco, 1905 NW. 78 Ave., Margate, Fla. 33063

[21] Appl. No.: 990,982

[22] Filed: Dec. 29, 1992

[51] Int. Cl.⁵ ............................................. B60R 25/10
[52] U.S. Cl. .................................. 340/435; 340/426; 340/693
[58] Field of Search ............... 340/426, 435, 436, 903, 340/565, 691, 693; 307/10.1, 10.2

[56] References Cited

U.S. PATENT DOCUMENTS

| | | | |
|---|---|---|---|
| 4,260,980 | 4/1981 | Bates | 340/904 |
| 4,772,875 | 9/1988 | Maddox | 340/522 |
| 4,823,051 | 4/1989 | Young | 340/567 X |
| 4,882,567 | 11/1989 | Johnson | 340/565 X |

Primary Examiner—Hezron E. Williams
Assistant Examiner—Christine K. Oda
Attorney, Agent, or Firm—Malloy & Malloy

[57] ABSTRACT

An assembly used to protect the driver or occupant of a motor vehicle, particularly police officers or the like from assailants surreptitiously approaching the automobile, when parked without the knowledge of the vehicle's occupants. The detection assembly comprises a plurality of motion detectors mounted on the exterior of the vehicle and cooperatively disposed relative thereto so as to monitor a surrounding area or perimeter of substantially 360 degrees. The occupants of the vehicle are warned by an alarm assembly which provides both audible and visible communication indicating that motion has been detected within the monitored external area surrounding the vehicle. In a preferred embodiment the plurality of motion detectors each comprise a microwave and passive infrared detector structure.

10 Claims, 2 Drawing Sheets

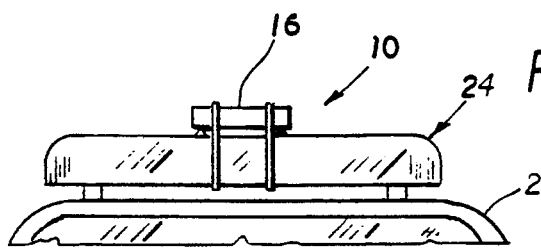
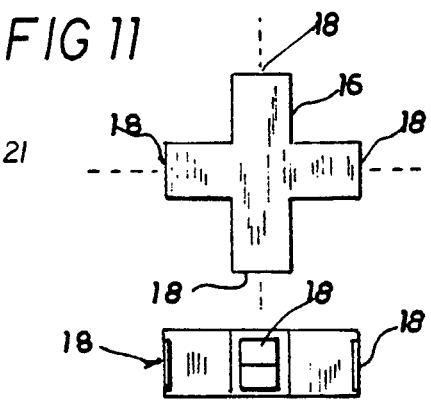
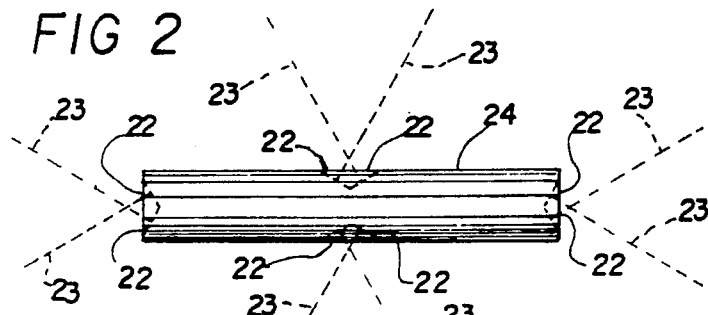
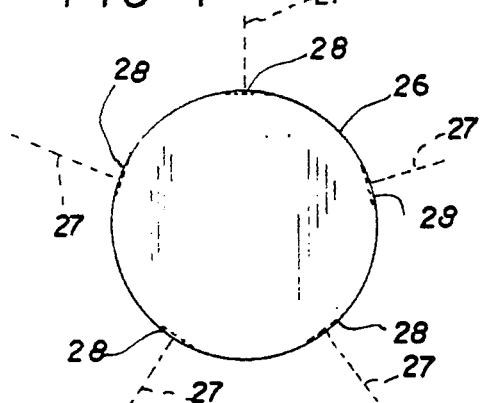
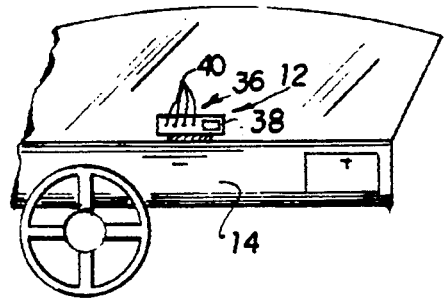
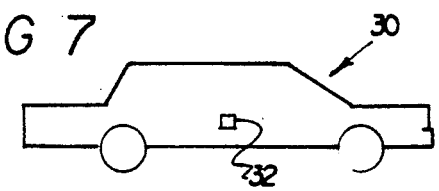
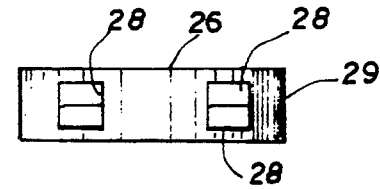
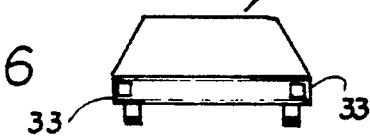

MOTION DETECTION ASSEMBLY FOR USE IN COMBINATION WITH A MOTOR VEHICLE

BACKGROUND OF THE INVENTION

1. Field of the Invention

The present invention relates to a perimeter detection assembly structured to detect and warn occupant's of a vehicle, such as a police vehicle, when someone is approaching the vehicle within a monitored area of substantially 360 degrees and within a certain distance from the vehicle.

2. Description of the Prior Art

It is a well recognized social problem that there is a general increase in violence generally and violent crimes in particular throughout our society. Police officers in particular while conducting their duty are increasingly the subject of violent attacks resulting in severe injury and death. For example Deputy Sheriff Behan was shot and killed while doing paperwork inside his police vehicle which was parked in the driveway of a convenience . store in Broward County, Fla. The assailant's approached the car without the knowledge of Officer Behan, walked up to the vehicle and attacked the officer without his knowledge. Because of situations like this and the overall increase in attacks not only to the civilian population but police officers as well as other public figures there is an increased need for protection of vehicles when they are parked in a manner which will adequately and accurately warn the occupant, such as a police officer, when his vehicle is being approached while it is parked.

It is recognized that certain technology in the form of passive motion detectors are commercially available such as from the C and K Systems Inc. which utilize Dual Tec IV, DT 435 and DT 450 Detectors having four relays, one push on push off switch, for 12 volt lights and one buzzer or piezo device. However, in and of itself the commercial availability of such a motion detector does not solve the problem of adequately protecting the occupant's vehicle when a potential assailant or aggressor surreptitiously approaches the vehicle intentionally without the knowledge of the occupants of the vehicle.

It is also recognized that certain other vehicle alarm systems are well known and available as evidenced by certain United States Patents. The Patent to Howell, et. al., U.S. Pat. No. 4,284,973 discloses a vehicle alarm system which is portable in nature and has a motion sensing switch and a transmitter for transmitting an alarm to remote receiver. The receiver is capable of several functions including a silent alarm to police or security guards as well as visual and audible alarms in remote locations such as light poles and rooftops for buildings. However, this alarm system is not specifically designed to warn or protect an occupant or occupants of a vehicle against immediate attack from someone surreptitiously approaching the vehicle without his knowledge.

The U.S. Patent to Nykerk, U.S. Pat. No. 4,987,402 is directed to an alarm system for sensing and vocally warning ah unauthorized approach to an object or zone such as but not limited to a vehicle. The alarm system referred to in this patent includes a proximity detector to detect the intrusion into an adjustable electromagnetic field set up around an object such as an automobile and means for generating vocal or voice synthesized signals for synthetic speech generation. The vocal signals instruct the intruder to back away rom the protected object before the alarm is triggered thereby preventing the intruder from inflicting any damage to the object or presumably to harm the occupant thereof. This structure is primarily directed to prevent breaking in or stealing the vehicle or having an intruder doing damage to the vehicle rather than warning an existing occupant that one approaches the vehicle. Also the detecting portion of this invention is termed generically as a proximity sensor and is structured to generate the aforementioned adjustable electromagnetic field. Intrusion into this field sets off the alarm portion of the assembly such as the vocal instructions to the intruder to "back away" beyond a certain distance.

The Patent to Samurai, U.S. Pat. No. 4,638,294 discloses a detection system for automobiles including an oscillator installed within the passenger compartment to generate an electromagnetic wave having a predetermined frequency dependent upon the size and or shape of the compartment. A detecting circuit is connected to the antennae structure to detect a change in the induced voltage level caused by the entry of a human body into the interior or compartment area of the vehicle and or the opening of the doors or windows thereby serving to generate a detection signal therefrom. This structure is primarily designed to prevent unauthorized entry, damage or stealing of the vehicle rather than to protect or warn an occupant as to an intruder approaching the vehicle for purposes of doing bodily harm.

Knapp, U.S. Pat. No. 4,951,045 and Hernandez, U.S. Pat. No. 4,415,979 both disclose alarm type systems including some type of detection system which provides an activation of the alarm or warning portion of the assembly when a person or object enters a monitored proximity within a certain range of the sensor. Based on the above and the knowledge by the inventor herein of what is commercially available there is still a recognized need in this industry for the adequate efficient and reliable protection of occupant's of a vehicle within a parked car whether those occupants are police officers, public figures or a member of the general population. Such device should preferably include not only adequate detection or monitoring facilities but should include a control assembly in association with an alarm device which serves to not only visually and or audibly warn the occupants but informs such occupants through such communication from the alarm assembly as to the general location of the intruder relative to the vehicle.

SUMMARY OF THE INVENTION

The present invention is directed toward perimeter detection device specifically designed for use with automobiles. The purpose of the subject invention is to notify the driver or other occupant of a parked vehicle by visual and or audio notification of someone breaching a monitored perimeter surrounding the vehicle. The area being monitored in surrounding relation to the vehicle may have a predetermined radius and preferably up to thirty feet using modern technology. This allows the occupant time to observe and react to their surroundings and insure that any approaching intruder into the monitor area is not meant to do harm either to the occupants or the vehicle.

The same technology may be used to eliminate an intruder from installing a bomb on a vehicle for example when the vehicle is unoccupied but parked in a readily accessible location. The detecting assembly of the present invention could be mounted and structurally adapted on a car which would serve to activate an alarm such as a loud siren or horn if the intruder comes within a reduced monitored area say of approximately 10 feet of the car. This would notify the appropriate personnel at their remote location that someone is in the area of the vehicle.

As will be explained in greater detail hereinafter passive motion detectors are commercially available from: C and K Systems Inc. utilizing Dual Tec IV, DT 435 Detectors. The plurality of monitors or detectors are therefore Dual Tech passive infrared with microwave detectors sealed in a plastic acrylic housing to prevent moisture from entering the electronics or other important components of the detectors when for example they are mounted on the exterior of the vehicle as is indicated in a preferred embodiment to be described in greater detail hereinafter.

More specifically, the present invention relates to a detection means including a plurality of motion detectors mounted in predetermined spaced relation to one another on the exterior of the vehicle being protected and monitored. A control means is mounted within the vehicle in communicating relation to the occupant wherein the control means includes an alarm assembly adapted to audibly and or visibly communicate activation of the detection of motion such as an intruder within the monitored perimeter or area surrounding the vehicle.

As will be explained with regard to each of the preferred embodiments of the present invention each motion detector is disposed and adapted to detect motion within a predetermined segment of the entire surrounding monitored area relative to the vehicle. Such individually monitored area, protected by a single one of a plurality of detectors is substantially independent of the other areas being monitored. However the number and placement of the plurality of motion detectors may of course vary. Independent of the number utilized, each embodiment clearly provides a monitored surrounding area relative to the vehicle of substantially 360 degrees. Through appropriate circuitry means to be described in detail hereinafter each of the motion detectors is connected to and adapted for activation of a separate individual one of the visual alarms such as a light or light device. Each of the lights in the control assembly will preferably be maintained in a "on" position indicating illumination. This occurs when the assembly is armed but there is no violation of the monitored space. In cooperation an audible alarm is used so as to audibly inform the driver or occupant of the vehicle when a specific segment of the area is being violated and in which such segment the intruder is present. Dependent upon the specific physical embodiment utilized, a varying number but a plurality of such detectors are mounted exteriorly, as set forth above. The subject perimeter detection device may include 4, 5, 8 or 10 microwave passive infrared motion detectors installed in different locations and or housings conforming either to the exterior of the vehicle itself or alternately to supplementary instrumental paraphernalia such as light bars of the type used on police vehicles.

As part of the aforementioned control means, an overall operable or control assembly or box is located on the interior of the vehicle such as on the dashboard near and in active range to the driver. The individual monitors or monitor detectors are mounted for example on the roof or in combination with the light aforementioned light bar as will be explained hereinafter. Numerous types of conventional mounting devices may serve to attach the individual monitors or monitor housing to the exterior of the vehicle and or such monitors may be incorporated in the existing devices such as the aforementioned official police light bar used on the roof of the vehicle. The subject assembly may be attached to the power source of the vehicle (or alternately have its own power source) by a simple cigarette lighter type of attachment as is well known in the art. Alternately the device may be attached by conventional conductors to the fuse panel of the vehicle for direct connection to the battery contained in the vehicle. Once the plurality of monitors are appropriately mounted and interconnected to the electrical power supply of the vehicle. A plurality of lights which define the alarm structure of the present invention are connected to the battery directly and are illuminated. After activation or illumination of the lights mounted on the control box a monitored perimeter surrounding the vehicle is established. Once broken by a heat source, human or otherwise, voltage is sent to an audible alarm such as a sounder buzzer or piezo type sounding device. This serves to alert the occupant of approach along with an appropriate one or more of the lights being extinguished or reacting in a "blinking" mode. This indicates the occupant which segment of the surrounding monitored area is being violated by a potentially harmful intruder.

BRIEF DESCRIPTION OF THE DRAWINGS

For a fuller understanding of the nature of the present invention reference should be had to the following detailed description taken in connection with the accompanying drawings in which:

FIG. 1 is a front view in partial cut-away of a plurality of motion detectors of the subject assembly mounted in one preferred embodiment.

FIG. 2 is yet another embodiment of the motion detectors being mounted in cooperation with auxiliary equipment of the vehicle.

FIG. 3 is a front view of the embodiment of FIG. 2.

FIG. 4 is a top view of yet another embodiment of the present invention.

FIG. 5 is a front view of the embodiment of FIG. 4.

FIGS. 6 and 7 are respective front and side views of placement of monitors on other than official vehicles such as on a limousine for the protection of occupants.

FIG. 8 is a representation of the control assembly associated with the subject invention.

FIG. 9 is an end view of the embodiment of FIG. 2.

FIG. 10 is a front view of the embodiment of FIG. 11.

FIG. 11 is a top view of the embodiment of FIGS. 1 and 10.

Like reference numerals refer to like parts throughout the several views of the drawings.

DETAILED DESCRIPTION OF THE PREFERRED EMBODIMENT

Figure 13:
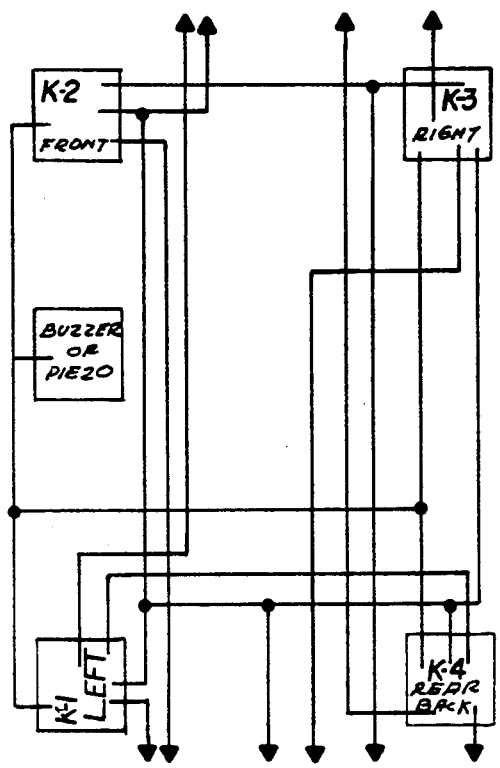
FIG. 13 is an additional schematic of the circuitry assembly of the present invention.

As shown in the accompanying figures, the present invention is directed towards a perimeter detection assembly generally indicated in FIGS. 1 as 10 and including a control assembly generally indicated in FIGS. 8 as 12 disposed on the interior of a motor vehicle such as but not limited to a police vehicle, taxi, or other type of vehicle for use by either public, official, or private individuals. The control assembly 12 is mounted on a dashboard or other readily accessible location as at 14 for ready communication with a driver or other occupant. Further, the perimeter detection assembly of the present invention each include a housing such as the housing 16 of FIG. 1 as well as FIGS. 10 and 11. Each of the housings to be described in greater detail hereinafter monitors defined by a plurality of individual motion detectors as at 18, each comprising a microwave detector 18a and an infrared detector 18b. Dependent upon the number of motion detectors utilized the overall configuration of the housing as at 16 may vary. In any event the substantially entire surrounding periphery about a vehicle is monitored through an arc of approximately 360 degrees. It is important to note and as will be pointed out with the individual embodiments each motion detector 18 is designed to monitor a given but separate segment of the entire area being monitored. Further as explained with regard to the circuitry of FIGS. 12, 13 and 14 each of the motion detecting monitors are individually connected to an audible and visible alarm assembly considered to be a part of the control means 12 in a manner which will indicate to the occupant or driver of a vehicle the location of the intruder as he enters the monitored surrounding area of the vehicle. This will immediately indicate to a driver where the intruder is located for a minimum lapse in response time for the occupant or driver to take any protective or other necessary action.

With regard to the embodiment of FIGS. 1, 10 and 11, four individual monitors 18 are mounted on the housing 16. The housing is a multi-sided configuration such that the monitors each face outwardly in a different direction but collectively scan the entire 360 degrees surrounding area relative to the vehicle 21 on which the housing 16 and plurality of monitors 18 are mounted.

With regard to the embodiment of FIGS. 2 and 3 each of the individual monitors 22 are secured to and essentially made a part of a light bar 24 which represents the housing on which the plurality of monitors 22 are secured. The light bar of course is similar to the light bar as at 24 on the roof of the vehicle 21 (see FIG. 2) but is modified to include therein the plurality of monitors 22. There are eight such monitors 22 in the embodiment of FIGS. 2 and 3 wherein they are grouped in monitor pairs. Accordingly, the eight monitors, collectively monitor various segments of a surrounding 360 degree monitored area. The individual segments each monitor 22 effectively covers as indicated by an imaginary line of sight as at 23.

With regard to the embodiment of FIGS. 4 and 5 yet another embodiment of the present invention includes a weather proof housing 26 having a somewhat circular configuration and having further mounted thereon a plurality of spaced apart motion detectors as at 28 secured to and mounted effectively about a peripheral somewhat cylindrical side wall. The individual monitors 28, as with the embodiment set forth above, are directed to monitor a specified but separate area in order to effectively monitor the entire surrounding area of a given vehicle. The cylindrical side wall may be represented as at 29 on the housing 26 and the imaginary lines of sight as at 27 are indicated separately for each of the motion detectors 28. Again, collectively the plurality of five motion detectors 28 monitor the entire surrounding peripheral area of substantially 360 degrees.

With regard to the embodiment of FIGS. 6 and 7 a more sophisticated or "luxury" embodiment may be mounted on more private vehicles such as limousines generally indicated as 30. In this embodiment the individual motion detectors may be mounted on the side as at detector 32 in FIG. 7 and or be mounted at each of two opposite ends of the vehicle 30 as indicated by one end of the vehicle 30 by motion detectors 33.

Figure 14:
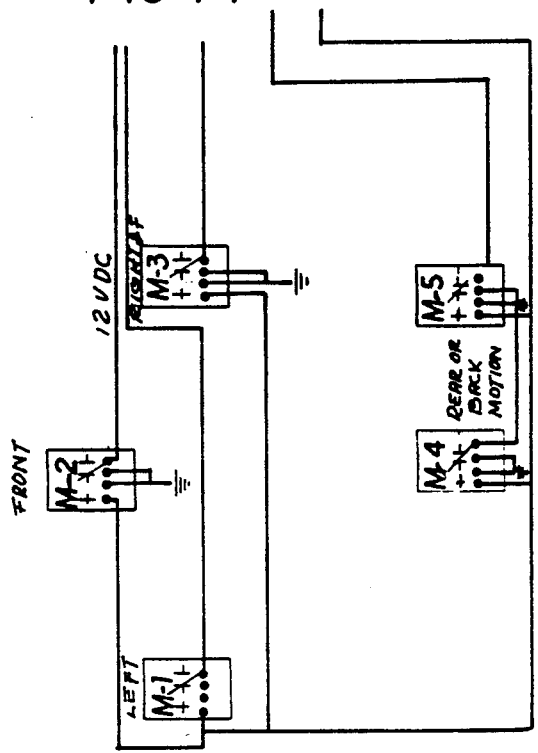
FIG. 14 is an additional schematic concerned in the circuitry assembly of the present invention.
Figure 12:
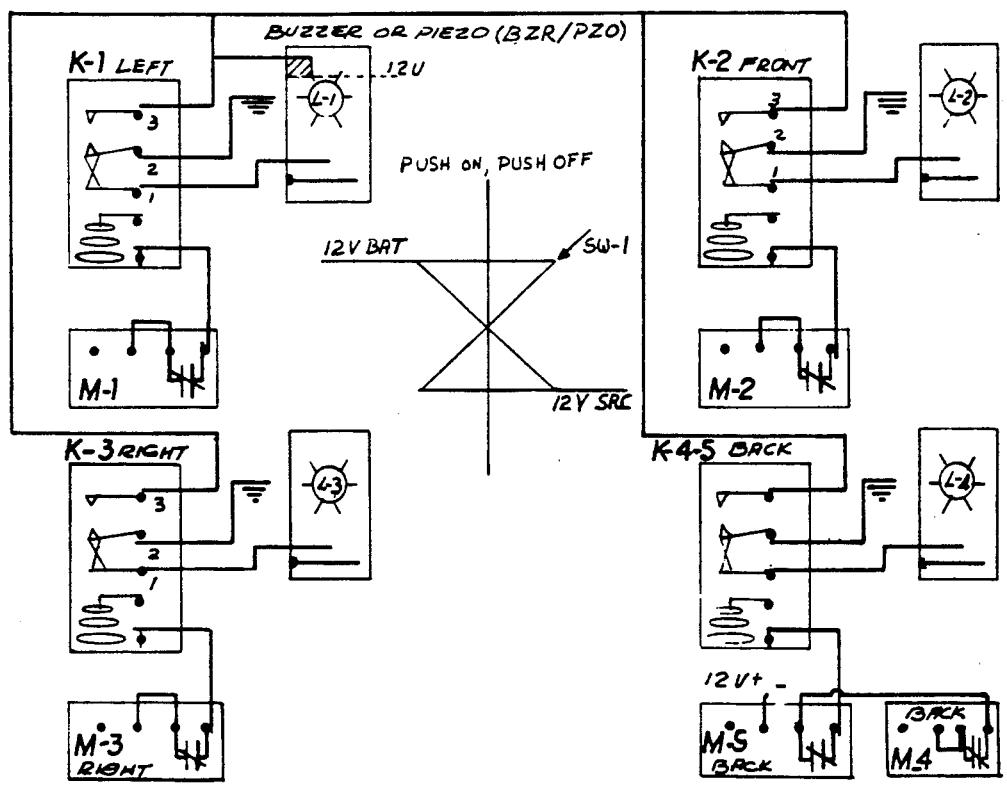
FIG. 12 is a schematic representation of the alarm assembly utilized in the present invention.

Regardless of the embodiment utilized a control means generally indicated as 12 is mounted on the interior of the vehicle wherein a control housing or control box as at 36 serves to contain not only circuitry as described in greater detail with reference to FIGS. 12, 13 and 14 but also certain audio and visual alarm structures to define an alarm assembly. An audio alarm is schematically represented by member 38 and the plurality of individual illuminating devices or lights are individually represented as at 40. The lights of the embodiment of FIG. 8 and more specifically with regard to the schematic of FIG. 12 are four in number and therefore represent the number of actual motion detectors utilized such as with the embodiment of FIGS. 1, 10 and 11. It should be apparent at this point however that the number of lights are equal in number to the number of motion detectors and such lights of course may increase or decrease so as to be equal to the number of motion detectors on the exterior of the vehicle.

Detailed operation of the device will be explained in greater detail with the operation of the schematics of FIGS. 12 and 13.

With regard to the schematic representations as disclosed in FIGS. 12, 13 and 14, the following reference numerals are set forth above and indicated in the following Legend:

| LEGEND | | |
|---|---|---|
| K1 = LEFT RELAY | M1 = LEFT MOTION DETECTOR | L1 = LEFT LIGHT |
| K2 = FRONT RELAY | M2 = FRONT MOTION DETECTOR | L2 = FRONT LIGHT |
| K3 = RIGHT RELAY | M3 = RIGHT MOTION DETECTOR | L3 = RIGHT LIGHT |
| K4 = REAR RELAY | M4 = REAR MOTION DETECTOR | L4 = REAR LIGHT |
| K5 = REAR RELAY | M5 = REAR MOTION DETECTOR | |
| SW-1 = SWITCH ON/OFF | BZR/PZO = BUZZER PIEZO | |

In the operation of the subject detection assembly, a heat source derived from a person's body or the like which enters the monitored area surrounding the vehicle it serves to interrupt one of the motion detector fingers and trips the trigger to open the circuit. This removes the negative ground from that particular relay coil causing the negative ground to be removed from the light. The light, normally being illuminated will then be extinguished. Simultaneously a negative ground on the buzzer piezo (BZR/PZO) because there is 12 volts present at the BZR/PZO and this serves to complete the circuit. The alarm will sound notifying the occupant of the vehicle of the violation or entrance of a person into that zone. The additional supply of switches or control buttons on the control panel of the control means will allow each zone to be engaged or disengaged by the occupant or user of the vehicle and alarm system.

Activating the push on/push off switch SW-1 to the on position places a 12 volt source at all relays, motion detectors, lights and the corresponding buzzer/piezo (BZR/PZO). With a common negative ground provided to all motion detectors all motion detectors become energized when SW-1 is engaged. With 12 volts applied to the motion detectors their trigger contacts are normally closed and a negative ground is connected to one side of the trigger at M1, M2, M3, M4 and M5. This provides a negative ground at relays K1, K2, K3 and K4-K5 coil's because there is 12 volts on the other side of the coil relay which engages thus providing a negative ground to light's L1, L2, L3 and L4 and due to the fact that 12 volts is present the lights will illuminate.

Now that the invention has been described:

What is claimed is:

1. A perimeter detection assembly for use in combination with a motor vehicle, said assembly comprising:
   a) a detection means mounted on an exterior of the vehicle and structured for detecting motion of an individual relative to the vehicle,
   b) control means mounted within the vehicle in accessible relation to an occupant thereof and including an alarm assembly structured to communicate activation of the detection means to the occupant of the vehicle,
   c) said control means further including circuitry means connected to an electrical power supply and structured for interconnecting said detection means and said alarm assembly to said electrical power supply,
   d) said detection means comprising a plurality of motion detectors being at least four in number and each of said plurality of motion detectors comprising a microwave and passive infrared motion detector,
   e) a housing mounted on an upper portion of the vehicle and including said plurality of motion detectors mounted on said housing in said spaced relation to one another,
   f) said housing configured to collectively dispose said plurality of motion detectors to detect motion throughout a surrounding area of 360° relative to the vehicle and each of said plurality of motion detectors positioned to detect motion within a different portion of said surrounding area of 360°, and
   g) said alarm assembly comprising a plurality of alarm structures equal in number to said plurality of motion detectors and each of said motion detectors being connected to activate a separate one of said alarm structures.

2. The assembly as in claim 1 wherein said alarm assembly comprises a plurality of audible alarm structures equal in number to said plurality of motion detectors.

3. The assembly as in claim 1 wherein said housing comprises a round configuration and said plurality of motion detectors are mounted thereon in spaced relation to one another about a periphery thereof.

4. The assembly as in claim 3 wherein said plurality of motion detectors are at least 5 in number.

5. The assembly as in claim 1 wherein said housing and said plurality of motion detectors are water-resistant.

6. The assembly as in claim 1 wherein said housing comprises a multi-sided configuration and includes each of said plurality of said motion detectors mounted on a different side of said housing and directed to monitor outwardly therefrom in a different direction.

7. The assembly as in claim 1 wherein said housing comprises an elongated light bar assembly secured to a roof portion of the vehicle and including two opposite ends and parallel, spaced apart longitudinal sides extending between said opposite ends.

8. The assembly as in claim 7 wherein the light bar assembly includes a different one of said plurality of motion detectors mounted on each of said opposite ends and each of said longitudinal ends.

9. The assembly as in claim 7 wherein said plurality of motion detectors are arranged in a plurality of motion detector pairs, each of said motion detector pairs disposed in spaced relation to one another on said light bar assembly and each of said plurality of motion detectors of each of said motion detector pairs being disposed in an angled relation to one another.

10. The assembly as in claim 9 wherein said light bar assembly includes a different one of said plurality of motion detector pairs mounted on each of said opposite ends and each of said longitudinal sides.

* * * * *